US009734595B2

(12) United States Patent
Lukac et al.

(10) Patent No.: US 9,734,595 B2
(45) Date of Patent: Aug. 15, 2017

(54) METHOD AND APPARATUS FOR NEAR-LOSSLESS COMPRESSION AND DECOMPRESSION OF 3D MESHES AND POINT CLOUDS

(71) Applicant: University of Maribor, Maribor (SI)

(72) Inventors: Niko Lukac, Lenart (SI); Borut Zalik, Kamnica (SI)

(73) Assignee: UNIVERSITY OF MARIBOR, Maribor (SI)

( * ) Notice: Subject to any disclaimer, the term of this patent is extended or adjusted under 35 U.S.C. 154(b) by 0 days.

(21) Appl. No.: 14/495,224

(22) Filed: Sep. 24, 2014

(65) Prior Publication Data

US 2016/0086353 A1 Mar. 24, 2016

(51) Int. Cl.
| | |
|---|---|
| *G06T 15/00* | (2011.01) |
| *G06T 9/00* | (2006.01) |
| G06T 19/00 | (2011.01) |
| G06T 17/20 | (2006.01) |
| G06T 15/10 | (2011.01) |
| G06T 17/00 | (2006.01) |

(52) U.S. Cl.
CPC ............. *G06T 9/00* (2013.01); *G06T 15/00* (2013.01); *G06T 15/10* (2013.01); *G06T 17/00* (2013.01); *G06T 17/20* (2013.01); *G06T 19/00* (2013.01)

(58) Field of Classification Search
CPC ......... G06T 19/00; G06T 17/20; G06T 17/00; G06T 15/10; G06T 15/00
See application file for complete search history.

(56) References Cited

U.S. PATENT DOCUMENTS

| | | |
|---|---|---|
| 4,122,440 A | 10/1978 | Langdon, Jr. et al. |
| 4,422,028 A | 12/1983 | Godwin et al. |
| 4,628,298 A | 12/1986 | Hafle et al. |
| 5,272,478 A | 12/1993 | Allen |

(Continued)

FOREIGN PATENT DOCUMENTS

| | | |
|---|---|---|
| WO | WO 2010/089380 A1 | 8/2010 |
| WO | WO 2010/149492 A2 | 12/2010 |

(Continued)

OTHER PUBLICATIONS

Repnik et al., "A fast algorithm for approximate surface reconstructions from sampled points," Advances in Engineering Software, 53 (2012), 72-78.

(Continued)

*Primary Examiner* — Abderrahim Merouan
(74) *Attorney, Agent, or Firm* — MH2 Technology Law Group LLP

(57) ABSTRACT

Fast near-lossless compression includes four steps: voxelization of the 3D geometry, decomposing the 3D voxel space into consecutive slices, encoding each slice with chain codes, and compressing the chain code with entropy coding. The decompression works by applying the aforementioned steps in inverse order. Smoothing over the voxels' centers is applied afterwards in order to reconstruct the input 3D points. Optionally 3D mesh is reconstructed over the approximate point cloud in order to obtain the original geometric object. The quality of the compression/decompression is controlled by resolution of the 3D voxel grid.

21 Claims, 11 Drawing Sheets

(56) References Cited

U.S. PATENT DOCUMENTS

| | | | | |
|---|---|---|---|---|
| 5,365,560 | A | * | 11/1994 | Tam .................... G06T 11/005 378/14 |
| 5,680,129 | A | * | 10/1997 | Weinberger .......... H04N 19/593 341/65 |
| 5,793,371 | A | | 8/1998 | Deering |
| 5,867,167 | A | | 2/1999 | Deering |
| 5,870,094 | A | | 2/1999 | Deering |
| 5,905,502 | A | | 5/1999 | Deering |
| 5,905,507 | A | | 5/1999 | Rossignac et al. |
| 5,988,862 | A | * | 11/1999 | Kacyra ................. G01B 11/002 382/195 |
| 6,002,794 | A | * | 12/1999 | Bonneau ............ G06K 9/00221 375/E7.03 |
| 6,239,805 | B1 | | 5/2001 | Deering |
| 6,314,205 | B1 | | 11/2001 | Masuda et al. |
| 6,525,722 | B1 | | 2/2003 | Deering |
| 6,831,637 | B1 | | 12/2004 | Mack |
| 6,995,761 | B1 | | 2/2006 | Schroeder et al. |
| 8,031,957 | B1 | | 10/2011 | Vinchon |
| 8,207,965 | B2 | | 6/2012 | Vinchon |
| 8,339,395 | B2 | | 12/2012 | Gruetzmacher |
| 8,340,446 | B2 | | 12/2012 | Jeon et al. |
| 8,493,381 | B1 | | 7/2013 | Touma et al. |
| 9,092,839 | B2 | * | 7/2015 | Koziarz ..................... G06T 9/00 |
| 2003/0214502 | A1 | * | 11/2003 | Park ...................... G06T 15/205 345/420 |
| 2004/0217956 | A1 | * | 11/2004 | Besl ........................ G06T 15/00 345/419 |
| 2006/0012597 | A1 | * | 1/2006 | Chakraborty ..... G06F 17/30259 345/419 |
| 2007/0262988 | A1 | * | 11/2007 | Christensen ............ G06T 15/08 345/424 |
| 2008/0144952 | A1 | * | 6/2008 | Chen ...................... H04N 19/12 382/239 |
| 2008/0219567 | A1 | * | 9/2008 | Claus ................... H04N 19/593 382/232 |
| 2008/0292164 | A1 | * | 11/2008 | Azar ..................... A61B 5/0091 382/131 |
| 2010/0074487 | A1 | * | 3/2010 | Miyamoto ............. A61B 6/503 382/128 |
| 2010/0128979 | A1 | * | 5/2010 | Monaghan ........... H04N 19/176 382/166 |
| 2010/0141489 | A1 | * | 6/2010 | Reznik ..................... H03M 7/40 341/67 |
| 2010/0239178 | A1 | | 9/2010 | Osher et al. |
| 2010/0266217 | A1 | | 10/2010 | Lee et al. |
| 2011/0010400 | A1 | | 1/2011 | Hayes |
| 2011/0158494 | A1 | * | 6/2011 | Bar-Shalev ............ A61B 6/032 382/131 |
| 2011/0234756 | A1 | * | 9/2011 | Adler ...................... G06T 5/002 348/46 |
| 2011/0252287 | A1 | * | 10/2011 | Kure ...................... H04N 19/63 714/758 |
| 2012/0036466 | A1 | * | 2/2012 | Venon ................... G06F 3/0482 715/772 |
| 2012/0124113 | A1 | | 5/2012 | Zalik et al. |
| 2013/0159263 | A1 | | 6/2013 | Paffenroth et al. |
| 2013/0322771 | A1 | * | 12/2013 | Poyil .................... G06K 9/4647 382/203 |
| 2015/0088479 | A1 | * | 3/2015 | Rahmes .................. E21B 41/00 703/10 |
| 2015/0235363 | A1 | * | 8/2015 | Bar-Shalev ........... G06T 7/0012 382/131 |

FOREIGN PATENT DOCUMENTS

| | | |
|---|---|---|
| WO | WO 2012/049471 A2 | 4/2012 |
| WO | WO 2012/174212 A1 | 12/2012 |

OTHER PUBLICATIONS

Cheng et al., "A novel 3D mesh compression using mesh segmentation with multiple principal plane analysis," Pattern Recognition, 43 (2010), 267-279.

Amenta et al., "A New Voronoi-Based Surface Reconstruction Algorithm," in Proceedings of the 25th Annual Conference on Computer Graphics and Interactive Techniques, 1998, pp. 415-421.

Huffman, "A Method for Construction of Minimum-Redundancy Codes," Proceedings of the I.R.E., Sep. 1952, pp. 1098-1102.

Sanchez-Cruz et al., "A new relative chain code in 3D," Pattern Recognition, 48 (2014) 769-788.

Gotsman et al., "Simplification and Compression of 3D Meshes," Springer-Verlag Berlin Heidelberg, 2002, pp. 319-361.

Karni et al., "Spectral Compression of Mesh Geometry," Proc. of 27th Annual Conference on Computer Graphics and Interactive Techniques, 2000, pp. 279-286.

Peng et al., "Technologies for 3D mesh compression: A survey," Journal of Visual Communication and Image Representation, 16 (6), pp. 688-733, 2005.

Lemus et al., "Representation of enclosing surfaces from simple voxelized objects by means of a chain code," Pattern Recognition, 47 (2014) 1721-1730.

Huang et al., "A Generic Scheme for Progressive Point Cloud Coding," IEEE Transactions on Visualization and computer Graphics, vol. 14, No. 2, Mar./Apr. 2008, pp. 440-453.

Gumhold et al., "Predictive Point-Cloud Compression," ACM SIGGRAPH, p. 137, ACM, 2005.

Alliez et al., "Recent Advances in Compression of 3D Meshes," Advances in Multiresolution for Geometric Modelling, Springer Berlin Heidelberg, pp. 3-26, 2005.

Zalik et al., "Chain code lossless compression using move-to-front transform and adaptive run-length encoding," Signal Processing: Image Communication, 29 (2014) 96-106.

Smith et al., "Progressive encoding and compression of surfaces generated from point cloud data," Computers & Graphics, 36 (2012) 341-348.

Schnabel et al., "Octree-based Point-Cloud Compression," Eurographics Symposium on Point-Based Graphics, (2006) pp. 111-120.

Merry et al., "Compression of Dense and Regular Point Clouds," Computer Graphics Forum, vol. 25 (2006) No. 4, pp. 709-716.

Salamon, "Data Compression: The Complete Reference," Springer, 4th Edition, 2007.

Amenta et al., "The Power Crust," in Proceedings of the Sixth ACM Symposium on Solid Modeling and Applications, 201, pp. 249-266, 2001.

\* cited by examiner

METHOD AND APPARATUS FOR NEAR-LOSSLESS COMPRESSION AND DECOMPRESSION OF 3D MESHES AND POINT CLOUDS

TECHNICAL FIELD

Aspects of the disclosure are related to data compression and more particularly to near-lossless compression of 3D meshes and point cloud data.

BACKGROUND

Following the advancement of 3D scanning devices, a significant amount of 3D points (frequently considered as point clouds) are obtained (e.g. 3D models of 3D mechanical parts or scans of the terrain). These point clouds are used directly (e.g. they are visualized by the point-based rendering approach) or a reconstruction process is applied to form a boundary representation of the scanned objects. In this case, topological relationships between scanned points are established leading to the polyhedral meshes. These polyhedral meshes are often triangular or quadrilateral.

3D meshes have a wide range of applications in entertainment (computer graphics, animation, virtual reality, visual effects (VFX)), science (visualization of various scientific data), engineering (design, manufacturing), and culture (digital heritage). For example, graphically rendered computer generated worlds in online games are almost completely made of 3D meshes that represent the surfaces of different entities. Transferring such data in reasonable time through the communication channels is generally solved by data compression.

Data compression represents the original data with fewer bits, in order to enable efficient storage and fast local or network-based transfer. This saves the storage space, transfer time and hardware costs. Binary data is usually compressed by either run-length or entropy encoding. The more common representatives of the latter are Huffman algorithm and arithmetic coding. Unfortunately, binary compression is not the most applicable form of compression when geometrical data is the input. For this, more sophisticated algorithms have been developed that decrease the information entropy by eliminating similarities within given data (e.g. similar regions in images), before applying binary compression.

The compression methods can be either lossless or lossy. In the latter case, a certain amount of original information loss is irreversibly introduced. These losses are acceptable only, if the human perception system still considers the data as acceptable (e.g. at compression of images, sounds, or videos, but not at text compression). Generally, the lossy compression yields better compression ratio, at the cost of lower quality. A good compromise is near-lossless compression, where the loss of quality is very small, while the compression ratio remains high. While the compression of images and videos has existed for a long time, the technological evolution of graphic hardware towards the end of the 20th century contributed to increasing demands for compression of 3D geometry—a relatively new subfield in data compression.

Various methods have been developed for the compression of 3D meshes and point clouds. Some of the first methods use variable length coding and delta-coding on individual vertices' positions. This was extended for out-of-core application by utilizing a mesh buffer. In an example of compressing and transmitting a 3D geometric model, geometric data is compressed either by the conventional Huffman coding or by the delta-coding. Another example compresses both the meshes' topology and the geometry. The former is encoded with constructive traversing over the dual-graph, while the latter is encoded by successive quantization and bit-plane arithmetic coding. Another example of a method includes compressing the regularly or irregularly tiled surfaces of 3D geometry by storing the differences of adjacent vertices. Another example of a method includes the compressions of geometric models by using spanning trees, where the data structure has a table of vertex runs, triangular runs, and zero or more marching records that define the connectivity. Another example of a method decomposes 3D objects into segments, where each segment's set of vertices is delta-coded and compressed using Huffman coding. Another example of a method includes a lossy compression of graphic data, where given models' faces are approximated by predetermined geometric shapes. Another example of a method includes the rewritable compression of triangulated data, where triangular stripes are identified from the neighboring triangles, and compressed using Huffman coding. Another example of a method includes a progressive geometry compression scheme based on semi-regular meshes that are used with wavelet transform, zero-tree coding, and subdivision-based reconstruction. Another example of a method includes a lossy compression scheme that quantizes extracted geometric primitives into integer values by using fixed grid. Another example of a method identifies regions of dominant valence and compresses a 3D model with reduced connectivity. Another example of a method includes a prediction scheme, where the spatial or dihedral angles between triangles are encoded relative to individual prediction triangles. The prediction residuals are then compressed with entropy or a range coder. Another example of a method includes 3D contents data encoding/decoding over its primitives by the use of predetermined encoding order consisting of quantization, predictive coding, and entropy coding. Another example of a method considers the compression of 3D meshes with repeated patterns, which are detected by clustering the scaling factors and orientation axes. The detected connected components are then quantized by using references to the clusters, and finally compressed with entropy encoding. Another example of a method includes a triangular mesh compression method that subsamples original data in order to generate low-resolution representation. Error values are calculated as the differences between the low resolution and original data. These are then thresholded and stored together with associated low resolution data. Another example of a method includes lossy 3D model compression, where the original 3D model is represented by 3D patches that are efficiently stored by using control points.

One of the compression methods for 3D meshes applies spectral methods to compress compact representation of 3D mesh data. They achieved this by projecting the mesh geometry onto an orthonormal basis that was derived from topological relations. Another example of a method includes segmenting 3D models using principal plane analysis. The obtained segments' geometry and topology are then compressed with triangle traversal scheme.

3D geometry can also be represented in the form of a huge amount of individual points, which do not have any topological relations. This is especially common in point clouds that are obtained using 3D laser-scanning technologies. Such collections of points are known as point clouds. An example of a method stores the point cloud into a 3D regular grid that is then rearranged into a 2D grid, where the data is compressed into the form of a gradient. Another example of a method includes a lossy point cloud compression method, where surfaces are constructed over the point cloud based on imposed error constraint. Then the surface is stored that requires a minimal amount of memory. Several methods are also specialized for the compression of LiDAR (Light Detection And Ranging) point cloud, which is a result for airborne-laser scanning (ALS) or mobile-laser scanning (MLS) in order to capture high-quality 3D representation of terrain, vegetation, and man-made objects. Of course, reconstruction algorithms can be used on point cloud and generate a 3D mesh in order to establish topology. The reconstructed mesh can be compressed with the aforementioned algorithms for 3D mesh compression. Another example of a method includes a predictive coding for single-rate compression of point cloud data. Another example of a method includes a progressive compression method based on octree decomposition of space and prediction schema. Another example of a method includes a technique for single-rate compression of point clouds by the use of a spanning tree within the prediction schema. Another example of a method uses iterative octree subdivision of the point cloud. At each subdivision, the authors approximate points' positions by the geometry centers of the octree nodes. Another point cloud compression method by using octree-based subdivision encodes the octree structure as well as the equations of least-square-fitted planes within each octree node. Therefore, the given compression is lossy, as the original point cloud data is lost. For decompression, the authors firstly decode the octree and the plane equations, and then they reconstruct the 3D model.

Chain codes are one of the more efficient representations for 2D contours, edges, and rasterized binary shapes. They are generally used within the image processing field. Various chain code compression algorithms have been developed. Chain code lossless compression using move-to-front transform and adaptive run-length encoding presented a 3D chain code method for compressing 3D discrete curves (e.g. 3D geometric object's skeleton). They have also shown that 2D chain codes are applicable for lossy compression of 2D rasterized slices (i.e. cross sections) from a voxelized watertight 2.5D mesh (e.g. digital terrain model). Voxelization transforms 3D points into 3D regular grid consisting of equally large cells called voxels (analogous to 2D pixels in images) that contain a scalar value. Such cross sections can be directly encoded with 2D chain codes. However, this scheme is not applicable for the compression of non-watertight 3D meshes or watertight 3D meshes, which consist of multiple separated segments with variable thicknesses. This can be addressed with voxelized watertight models by using a 3D chain code over Hamiltonian cycle of the voxels' graph. Since, the construction of such cycle is NP-complete, it is not suitable for larger datasets that are used in practice.

BRIEF DESCRIPTION OF THE DRAWINGS

Various features of the implementations can be more fully appreciated, as the same become better understood with reference to the following detailed description of the implementations when considered in connection with the accompanying figures, in which.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Electrical, mechanical, logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Implementations of the present disclosure relate to the compression of 3D geometric meshes and point cloud data. Various implementations consists of a binary voxelizator, slice decompositor, chain code encoder, and entropy encoder. The binary voxelizator is responsible for voxelization of 3D points from 3D mesh vertices or point cloud data, where the resulting voxels within the 3D grid contain a binary scalar value (i.e. empty or occupied). The compression is near-lossless because of the quantization induced by the voxelization. Further, only the compression of geometry is considered. The voxel 3D grid is then divided into 2D slices having thicknesses of one voxel. The slices represent 2D raster grids, and are perpendicular to the coordinate axis of the shortest bounding box side of the considered 3D mesh or point cloud. Each slice contains one or more 2D segments consisting of occupied pixels. The segments are preprocessed before they are encoded by the chain codes. Optionally, thinning is applied on each segment in order to generate contours with widths of one pixel. The contours are then encoded by a chain code algorithm. The starting positions (x and y coordinates) of each contour are coded as a nearest offset to either the grid's center of the 2D slice, or one of the previously coded segments, or from one of the grid's four corners. The starting position is then coded using the variable length coding (VLC) scheme. The resulting chain codes from different segments are then further compressed by using entropy coding.

In implementations, the decompression is done by entropy-based decoding, chain code decoding into 2D segments, constructing a 3D grid out of decoded slices, and extraction of points from voxels. 3D points denoting extracted voxels' center positions are smoothed by average smoothing over each point's local neighborhood. Optionally a reconstruction algorithm is applied in order to construct the 3D mesh.

Figure 1A:
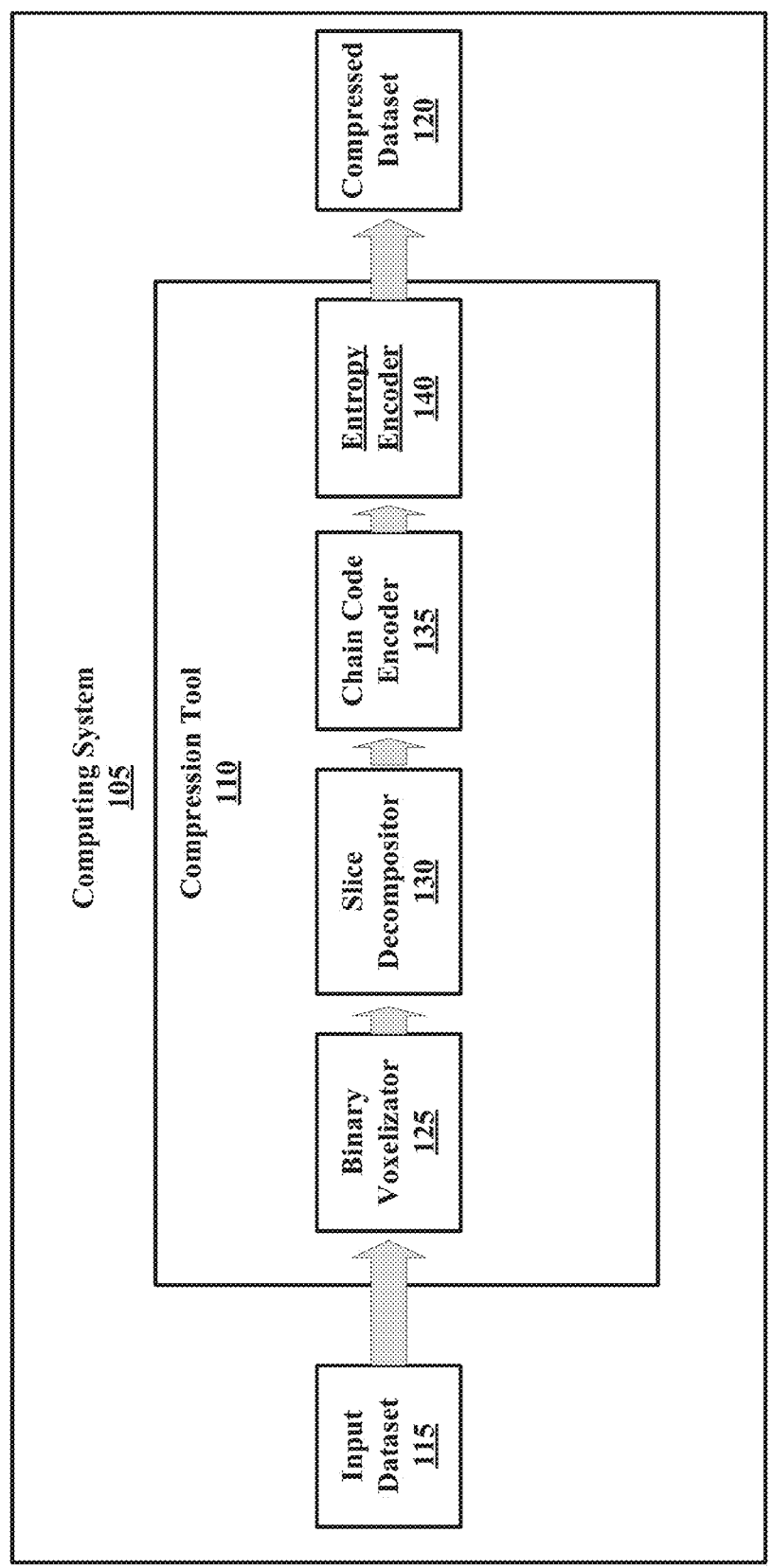
FIG. 1A is an example of a computing system and compression tool for performing compression, according to various implementations.

FIG. 1A illustrates an example of a computing system 105 that includes a compression tool 110 for performing compression, according to various implementations. While FIG. 1A illustrates various components contained in the computing system 105, FIG. 1A illustrates one example of a computing system and additional components can be added and existing components can be removed.

In implementations, the compression tool 110 can be configured to receive an input dataset 115, compress the input dataset 115, and output a compressed dataset 120. The compression tool 110 can be configured to perform near-lossless compression of geometric 3D meshes or point cloud data. The input dataset 115 can be voxelized based on the user-input resolution. This parameter can control the quality of the quantization. The 3D voxel space can be sliced into 2D raster grids, where on each slice segments are detected. The segments can then be coded using chain codes and further compressed using specific chain code compression algorithm and entropy coding.

In implementations, the functions, processes, and operations of the compression tool 110 can be implemented in hardware, software, or combinations thereof. As such, the compression tool 110 can be configured to include the necessary logic, instructions, algorithms, and interfaces to perform the functions, processes, and operations. In implementations, the compression tool 110 can include a binary voxelizator 125, slice decompositor 130, chain code encoder 135, and entropy encoder 140.

The compression tool 110 can also be configured to perform decompression. The compression tool 110 can be configured to perform the inverse process described below to decompress the compressed dataset 120. When the decompression is performed, the points can be reconstructed by using the center positions of the voxels of the decoded chain codes representing segments' contours. These can be additionally smoothed based on their local neighborhoods. Optionally a point cloud reconstruction algorithm can be used in order to re-establish topology.

Figure 1B:
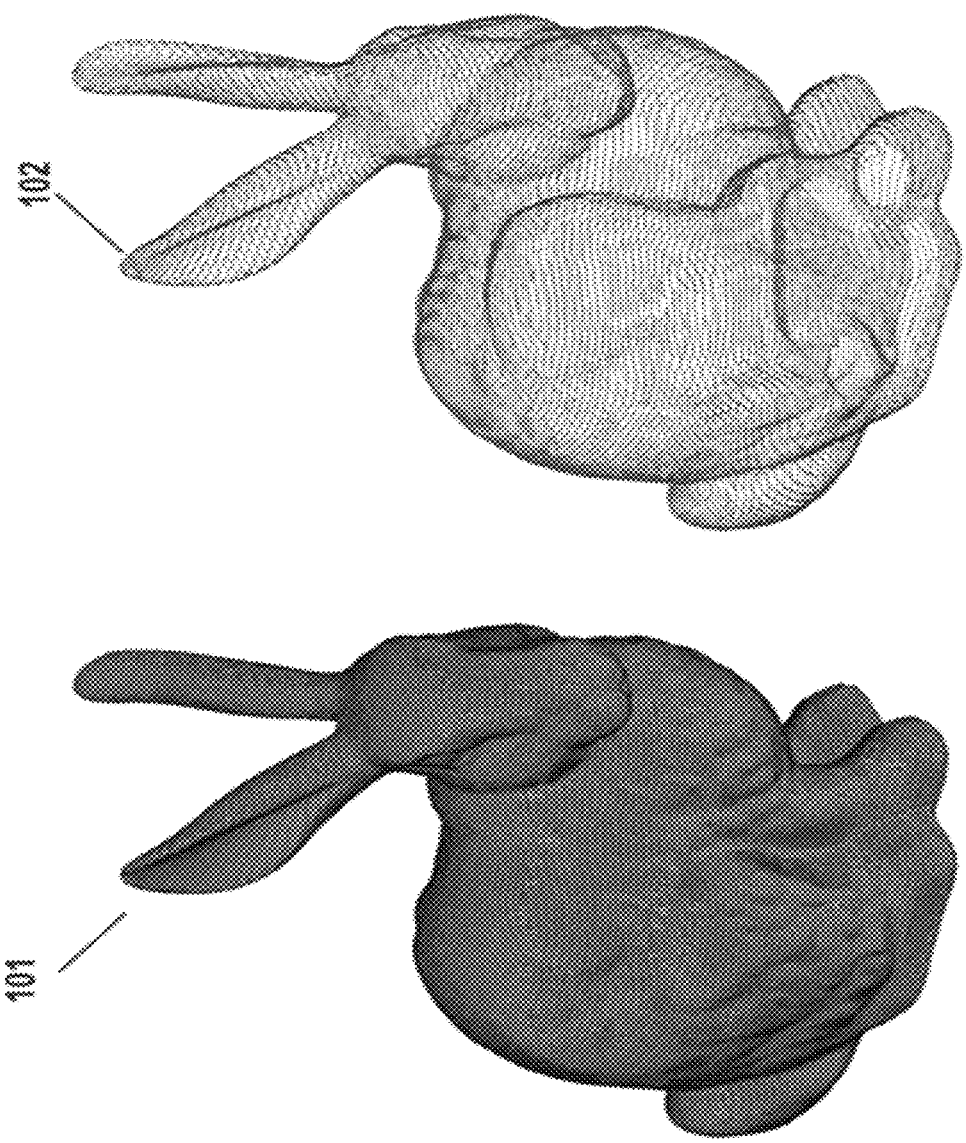
FIG. 1B is an example of the input data consisting of either point cloud or 3D mesh, according to various implementations.

In implementations, the compression tool 110 can receive the input dataset 115 as a 3D mesh or a point could. 3D meshes and point clouds can consist of millions of 3D points that are denoted with spatial {x, y, z} coordinates, which can be difficult for efficient storage and quick transferal in reasonable time. Near-lossless data compression presents a viable solution for reducing the size of the original dataset, while not significantly reducing its quality. For example, as shown in FIG. 1B, the input dataset can be either a 3D mesh 101 or a point cloud 102. For the purpose of easier explanation regarding various implementations, a Stanford Bunny is used as an example input dataset 101 and 102 throughout the description that follows.

In implementations, the input dataset 115 can include data that represents any type of image. Likewise, the input dataset 115 can be received or retrieve from any source. For example, the input dataset 115 can be received or retrieve from storage of the computing system 105, from another software application of the computing system 105, from an input/output device of the computing system 105, from a network interface of the computing system 105, and combination thereof. Also, the compressed dataset 120 can be output to any number of locations. For example, the compressed dataset 120 can be output to storage of the computing system 105, to another application of the computing system 105, to an input/output device of the computing system 105, to a network interface of the computing system 105, and combination thereof.

Figure 2:
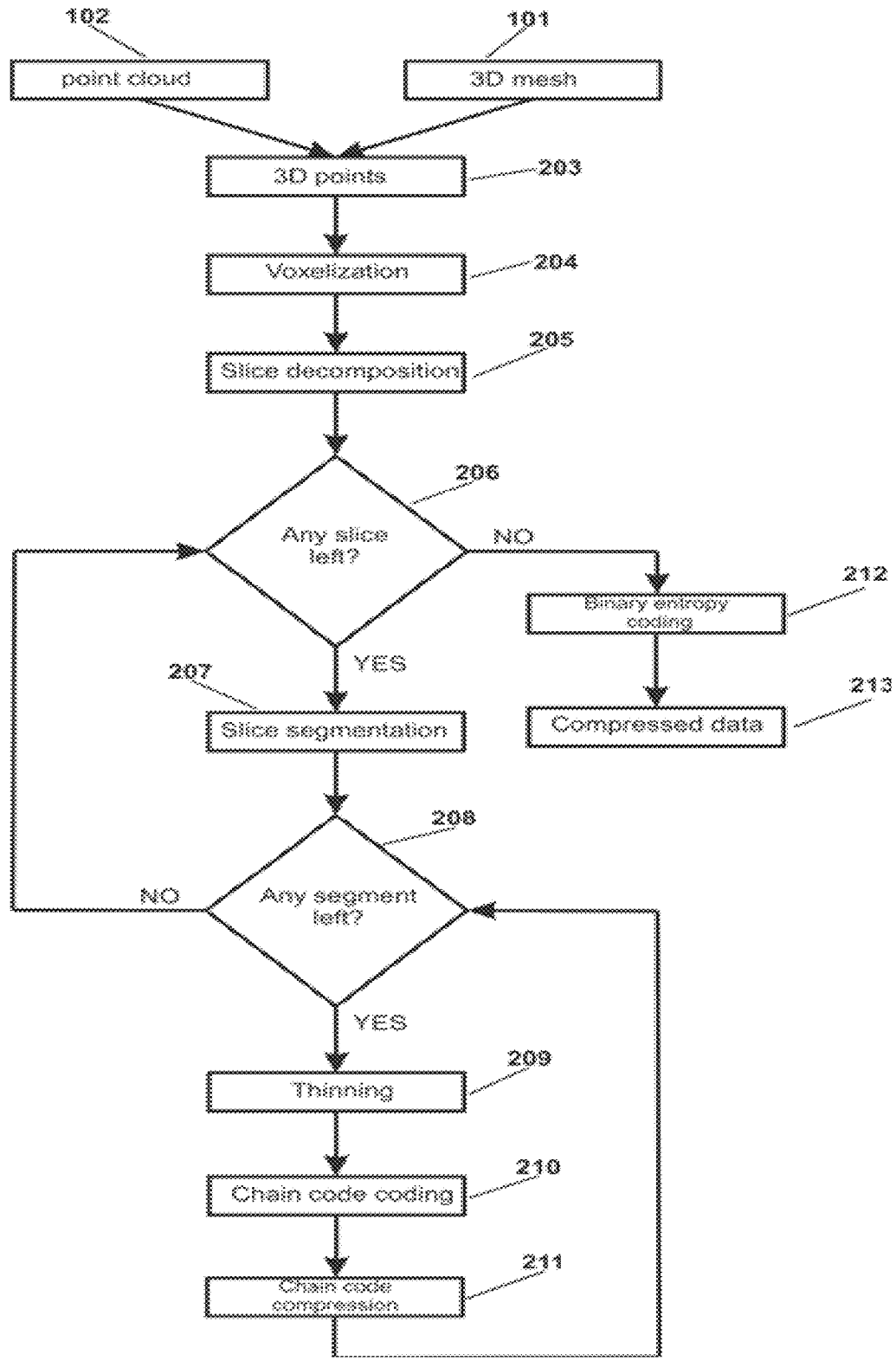
FIG. 2 is a block diagram of an example process of compression, according to various implementations.

FIG. 2 illustrates an example of a method of near-lossless compression of the 3D points, according to various implementations. The illustrated stages of the method are examples and that any of the illustrated stages can be removed, additional stages can be added, and the order of the illustrated stages can be changed.

After the process begin, in 203, the compression tool 110 can identify the points 203 of the 3D mesh 101 or the point cloud 102.

Figure 3:
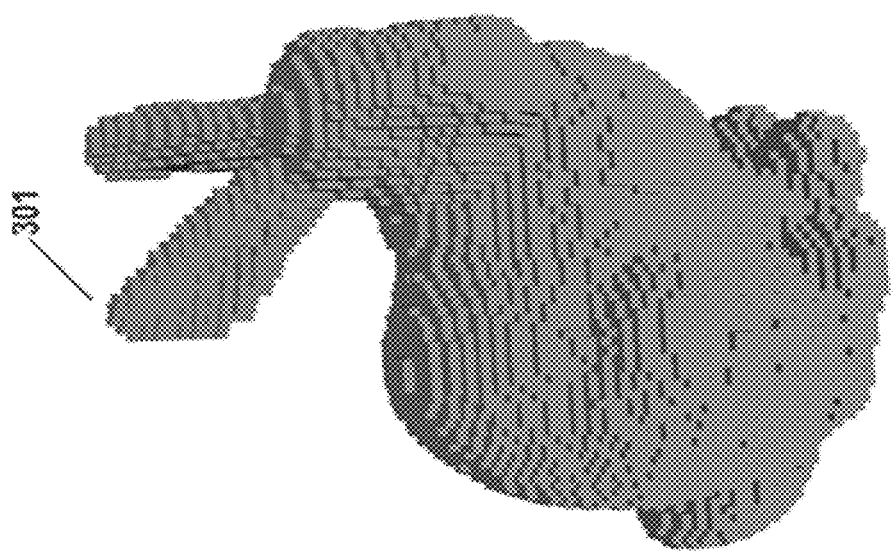
FIG. 3 is an example voxelization of the input point cloud, according to various implementations.
Figure 3:
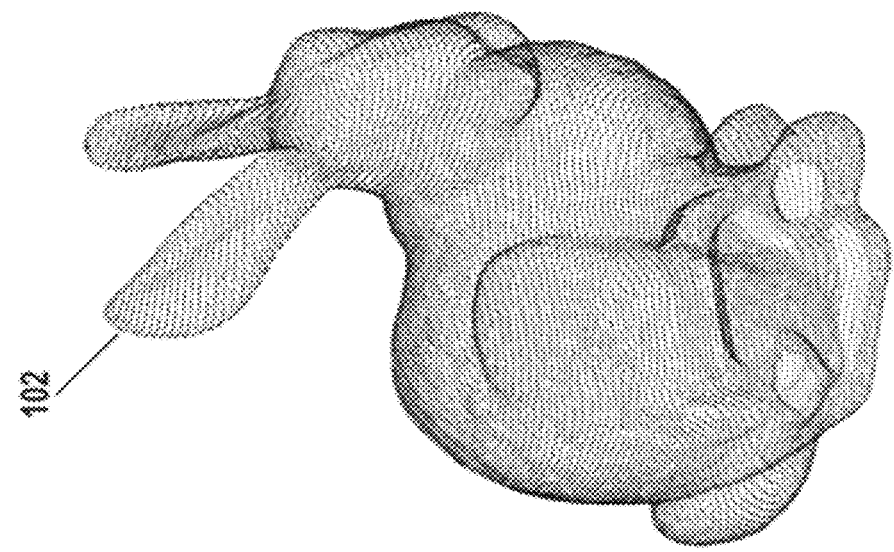

In 204, the compression tool 110 can voxelize the points into a 3D regular grid consisting of equal-sized cells (i.e. voxels). Before the voxelization is performed 204, the resolution can be defined by the user of the compression tool 110. The resolution can define the number of voxels per coordinate axis. The entire voxel space can comprise $res_x * res_y * res_z$ voxels. An illustrative example is shown in FIG. 3, where the point cloud 102 is voxelized at $res_{\{x,y,z\}}=64$ 301. Each input point falls into one of the voxels, where the voxel's 3D position is determined as:

$$v_{\{x,y,z\}} = \frac{res_{\{x,y,z\}} * (p_{\{x,y,z\}} - \min_{\{x,y,z\}})}{\max_{\{x,y,z\}} - \min_{\{x,y,z\}}}, \quad (1)$$

where p denote a given point and v is the voxel where p is located. The $\min_{\{x,y,z\}}$ and $\max_{\{x,y,z\}}$ denote the extreme coordinates (i.e. the AABB) of the input data.

In 205, the compression tool 110 can determine 2D slices (i.e. cross-sections) for the voxel-space using a slice decomposition scheme. These slices can be represented as a 2D binary raster grid. The slices are orthogonal to the shortest side-length of the axis-aligned bounding box (AABB) of the considered 3D point cloud.

Figure 4:
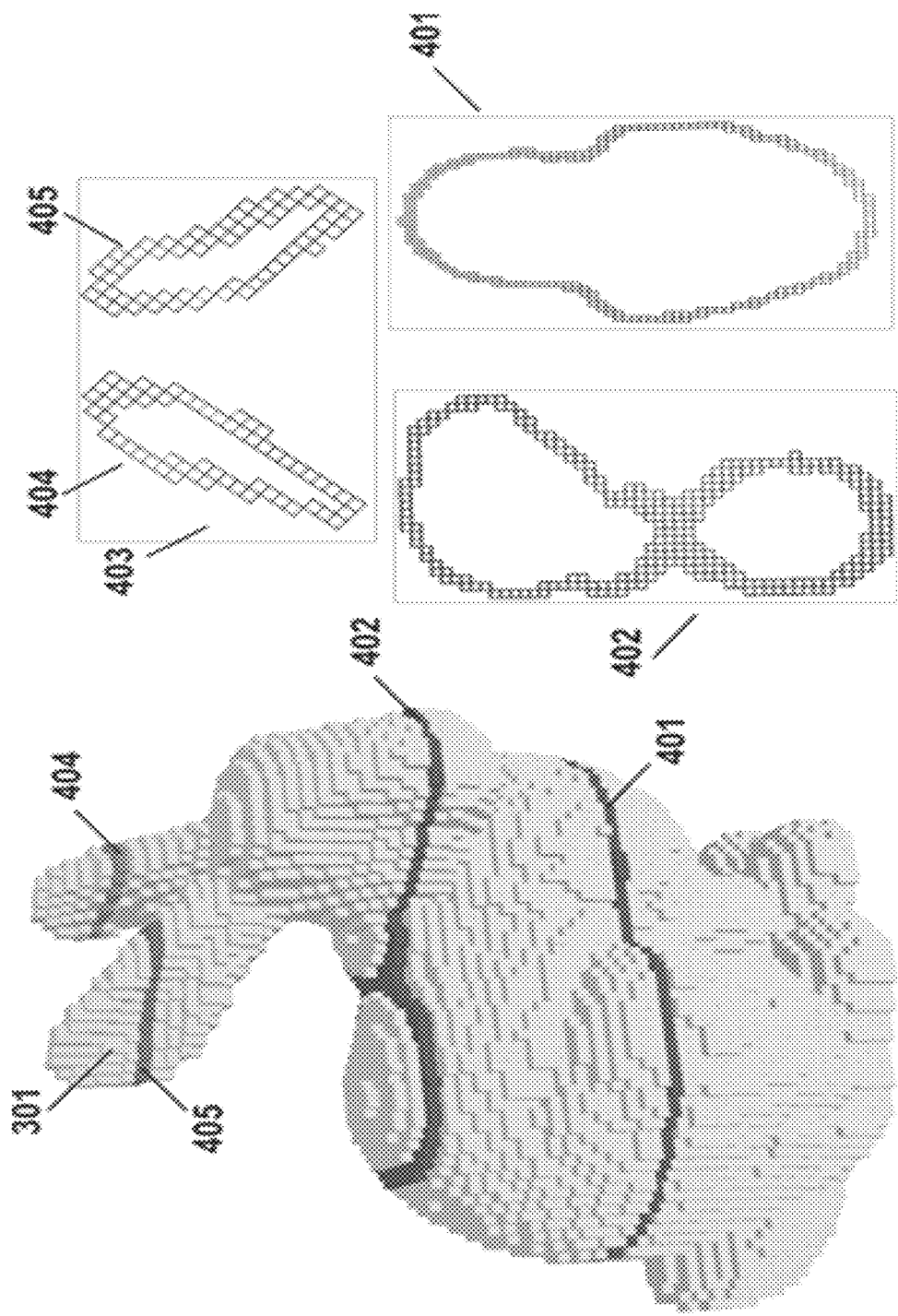
FIG. 4 is an example of the voxelized models' slices and segments, according to various implementations.

For example, as illustrated in FIG. 4, the 3D voxelized space 301 can be sliced into 2D cross-sections 401. The slicing can be performed in any direction. For the sake of simplicity and performance, the direction is chosen to be parallel to one of the coordinate axes. This method considers the shortest side of the AABB, which is determined as:

$$\min(\min(\max_x - \min_x, \max_y - \min_y), \max_z - \min_z). \quad (2)$$

This provides the least number of slices from the three possible choices. Such a scenario is desirable for achieving better compression when using chain code encoding, since less segments are generated, and hence a lesser number of starting positions need to be encoded, as discussed in the next steps. The slicing is performed from the chosen maximum toward the minimum bounding side. It can be performed in the opposite direction as well. More advanced voxelization can be used instead, where the resolution changes dynamically based on the relative density of the points (e.g. by using octree decomposition). In that given scenario the resolution is stored for each slice separately.

In a bottom-up manner each slice 403 is then segmented into regions consisting of contiguous voxels 404 405 by using a flood fill algorithm. This is a known algorithm for separating foreground (i.e. 1) regions from the background (i.e. 0). It works by connecting foreground pixels as long as they are cardinal neighbors to each other. For a single pixel it is defined as:

$$f(x,y) = \begin{cases} i & G(x+1,y)=1 \vee G(x-1,y)=1 \vee \\ & \vee G(x,y+1)=1 \vee G(x,y-1)=1, \\ 0 & \text{else} \end{cases} \quad (3)$$

where i denotes the given region's index, and G is the raster grid of the 2D slice. This function is then recursively called for any foreground neighboring pixels.

In 206, the compression tool 110 can iteratively process each slice. The compression tool 110 processes each slice until all the 2D slices have been processed. In 207, the compression tool 110 can divided a slice into segments consisting of connected pixels.

In 208, the compression tool 110 can iteratively process each segment of a 2D slice. The compression tool 110 processes each segment until all the segments of a particular 2D slice have been processed. In 209, the compression tool 110 can optionally thin each segment within a given 2D slice in order to smooth out the outer edges.

Figure 5:
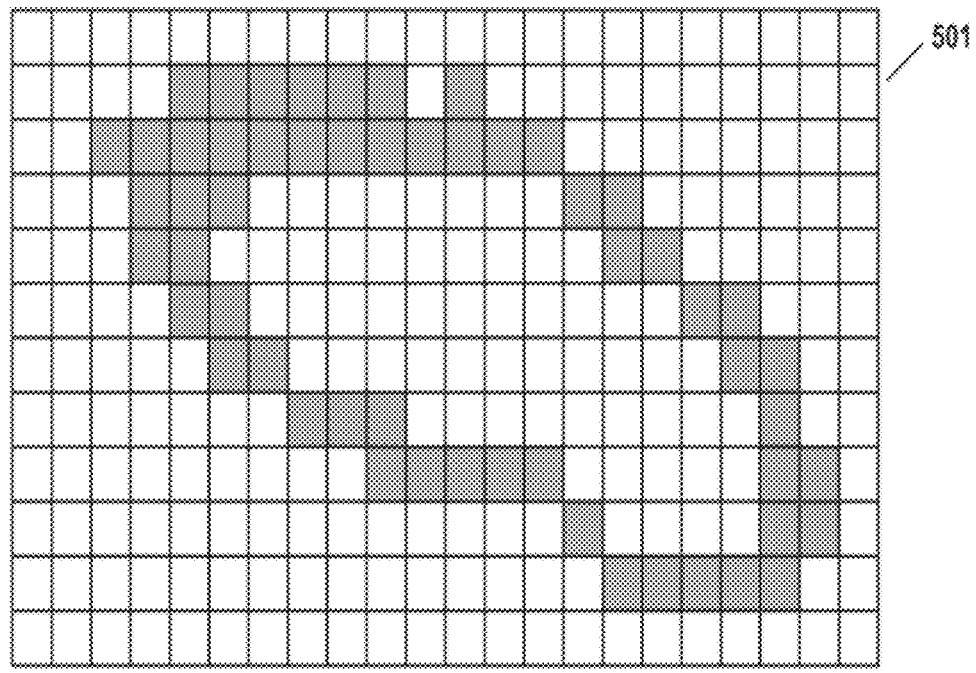
FIG. 5 is an example of the application of thinning over a given segment, according to various implementations.
Figure 5:
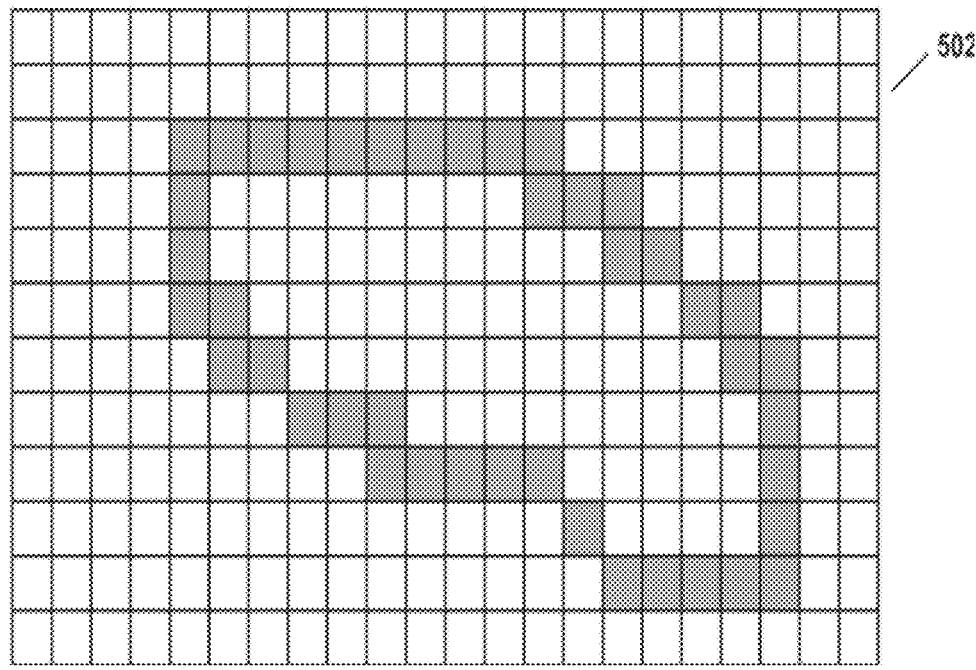
Figure 6:
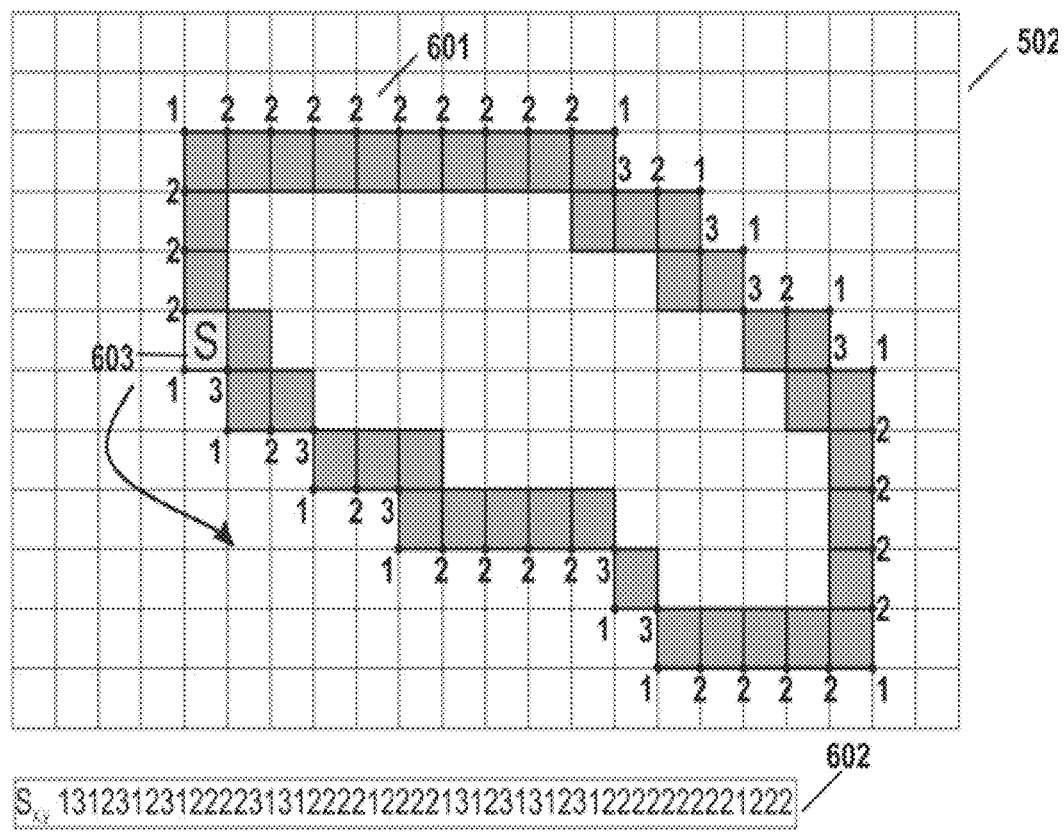
FIG. 6 is an example of VCC encoding, according to various implementations.
Figure 7:
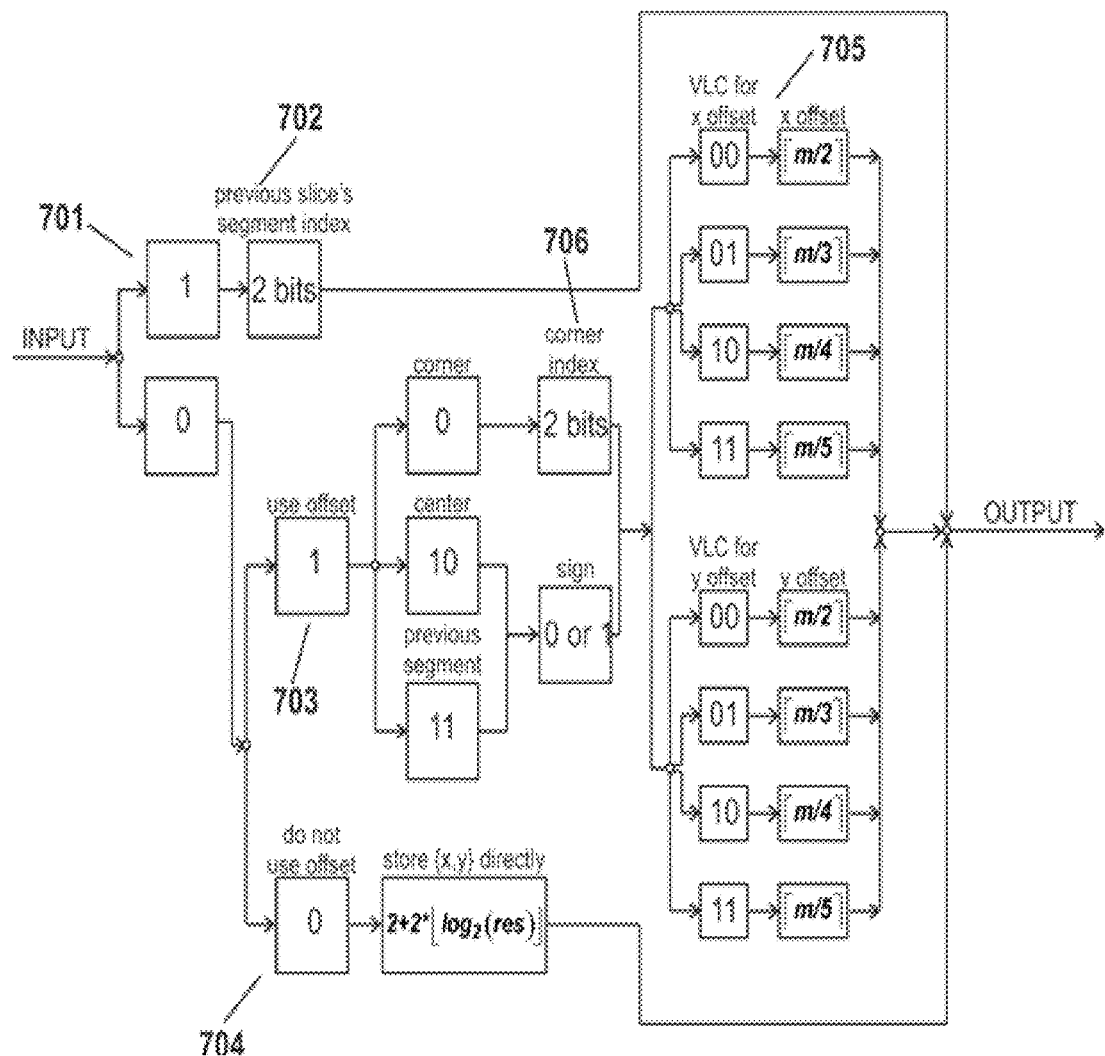
FIG. 7 is a block diagram of the coding scheme for storing the segment's starting position coordinate (used bits are denoted in rectangles), according to various implementations.
Figure 8:
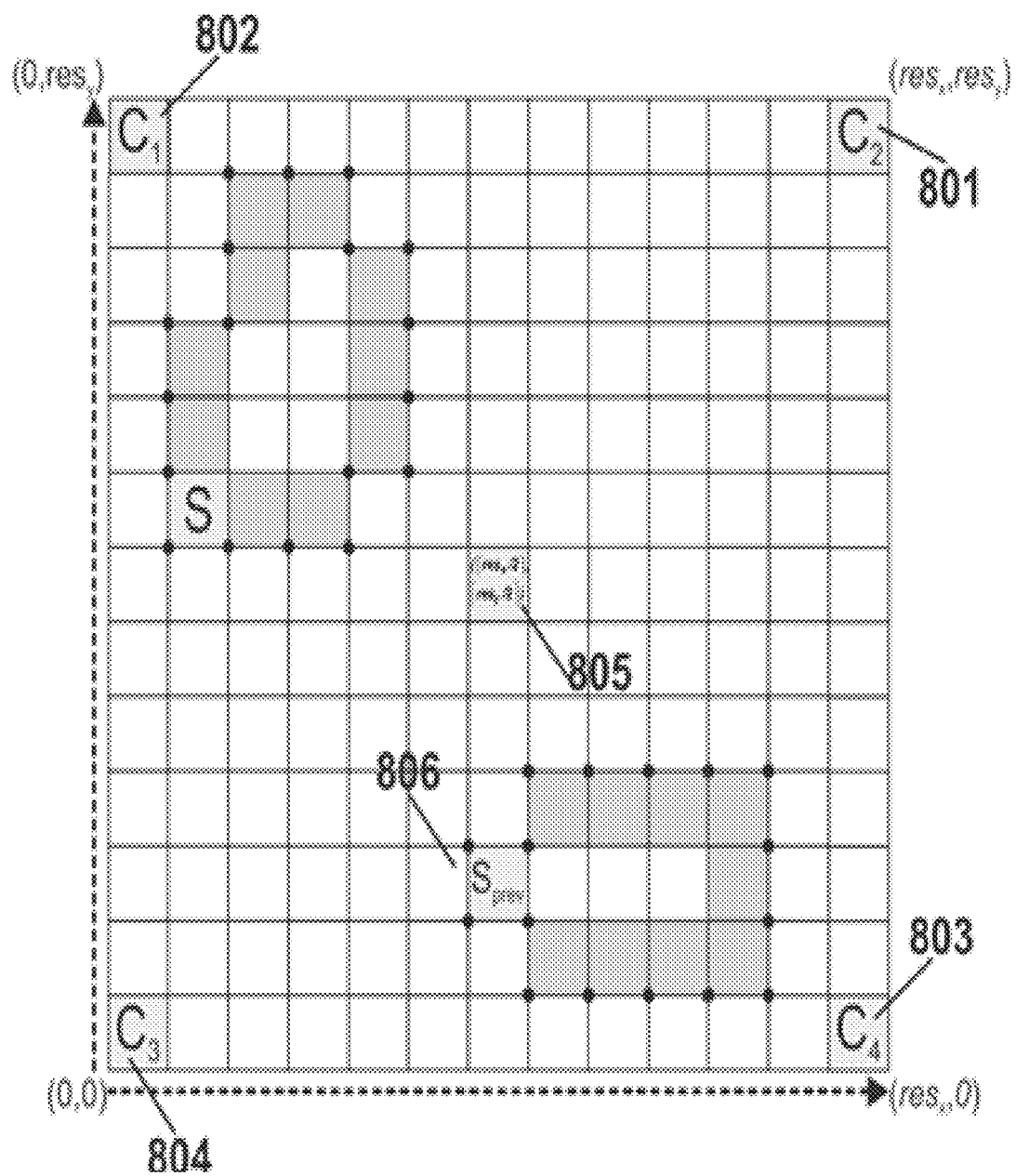
FIG. 8 illustrates the positions used within the 2D raster grid for coding the segment's starting position offset, according to various implementations.

For example, as illustrated in FIG. 5, once individual segments are known 501, they can be optionally thinned 502. Before the application of thinning, those holes between segments in close proximity can be filled using morphological closing or a similar method. For an example, the Zhang-Suen thinning algorithm can be used. This algorithm uses the eight-neighborhoods within a given pixel, in order to determine whether the pixel should be removed. Of course, any other algorithms that induce thinning could be used such as morphological skeleton, medial-axis, or edge detection algorithms.

In 210, the compression tool 110 can encode created contours using a chain code algorithm. For example, the compression tool 110 can utilize chain code algorithms such as Freeman, DDCC, DCC, VCC, V_VCC, C_VCC, 3OT, NAT, and DDCC_RLE. In 211, the compression tool 110 can further compress the chain code. For example, the compression tool 110 can utilize compression algorithms such as MTFT and ARLE.

For example, as illustrated in FIGS. 6-9, once the segments within the 2D slice have been found and further processed, the chain code encoding can be performed in a clockwise direction by tracking the outer edge of the given segment's contour. The chain code encoding direction can also be anti-clockwise. For this encoding, any chain code algorithm can be used, while for demonstration purposes the Vertex Chain Code (VCC) 601 is used. It is defined with three symbols {1, 2, and 3} that are used to mark three different cases of contour transition over two adjacent pixels. The convex and concave parts are marked with the symbols 1 and 3, respectively. Symbol 2 is used for the case when the contour direction over two adjacent pixels does not change. Furthermore, the given chain code 602 can then be compressed by Move-To-Front Transform (MTFT) and Adaptive Run-Length Encoding (ARLE) as proposed by Žalik and Lukač, "Chain code lossless compression using move-to-front transform and adaptive run-length encoding," Signal Processing: Image Communication, 29, pp. 96-106, 2014. However, any other chain code compression algorithm can be used. Each segment's encoding with the chain code requires a starting position 603 denoted by {x, y} coordinates.

The ending position is not required in a case where the contour is closed. Otherwise the ending is denoted by creating a virtual closed loop that has a 2×2 pixels size, by using the given chain code (e.g. four symbols of 3s in VCC). Each segment's starting position needs to be known for the 3D model reconstruction after decoding the chain-coded 2D slices.

In implementations, an efficient coding scheme is proposed for the segments' starting positions. The first segment's starting position from the first 2D slice is coded twice; firstly as floating-point 3D coordinates requiring $3*2^n$ (n is generally 32 or 64, based on the hardware architecture) bits that were calculated as an average point from the points within the given voxel, and secondly as the 2D position within the raster grid. The first coordinate type is used to approximate the original position of the input data, and is used only for the very first segment within the dataset. The second type of coordinates denotes the segment's position within the raster, and is used for every segment. This is based on the fact that the coordinates cannot be located outside the raster grid with the resolution of $res_x \times res_y$ pixels. All other segments are then stored as offsets to achieve more efficient coordinate storage. If a given segment S with starting position overlaps one of the four previous segments starting positions at the previous slice, then the current segment S is disregarded. Such a scenario is coded with bit $1_2$ 701.

Following this bit, two bits 702 are used to denote one of the four possible previous segments on the previous slice, where the last segment is denoted as $00_2$ and the fourth-to-last as $11_2$. All other scenarios are coded with bit $0_2$, and additional bits for different cases. One bit is used to denote whether the position is stored within the variable length coding (VLC) scheme 703 or saved directly 704 by using $(2+\lfloor \log_2(res_x) \rfloor + \lfloor \log_2(res_y) \rfloor)$ bits. In the case of the former, the starting position is determined with Euclidean distance (i.e. denoting the offset) of the closest segment's pixel to either the previously coded segment's starting position, one of the four corners of the 2D slice, or the slice's center position:

$$d_{min} = \arg_{S_i} \min(\sqrt{(S_{i_x}-X_x)^2+(S_{i_y}-X_y)^2}) \forall X \in \{C, T, S_{prev}\}, \quad (4)$$

where $S_i$ is the closest pixel to the given pixel X, C={($res_x$, $res_y$), (0, $res_y$), (0, 0), ($res_x$, 0)} denotes the four corners of the 2D slice 801 802 803 804, and T={⌈$res_x/2$⌉, ⌈$res_y/2$⌉} is the center 805 of the raster grid. $S_{prev}$ is the position of a possible previous segment 806 on the same slice. For denoting the closest position to $S_i$ from which the offset is considered, the VLC scheme is used, where $0_2$ bit denotes that the closest pixel is one of the corner pixels. Following this bit, two bits are used to denote the corner pixel's index 706. In those cases where the center pixel or previous segment position are considered as the closest pixels, then bits $10_2$ and $11_2$ are used, respectively. In this case one additional bit is used for storing the sign (i.e. $0_2$ for minus and $1_2$ for plus). The offset starting position P of the given segment is then calculated as:

$$P=(S_{i_x}-X_x, S_{i_y}-X_y), d(S_i,X)=d_{min}. \quad (5)$$

Once P is determined, it is stored by using the second VLC schema 706. Two bits denote that m/2, m/3, m/4, or m/5 bits are used to store the offset for each coordinate, where $m=2+2*\lceil \log_2(res) \rceil - r$ and r is the number of bits required to code the offsets. If the coordinate offsets require more than m/2 bits, then they are stored without using the described scheme. The processes described above are not limited to this coding scheme for the segments' starting positions, e.g.

statistical analysis could have been performed and Huffman or arithmetic coding could be used instead of the described scheme. Those segments' contours that are coded with compressed chain codes are stored sequentially.

In 212, the compression tool 212 can apply binary entropy coding over the resulting compressed chain code, in order to achieve higher compression rates. For example, the compression tool 110 can apply binary entropy coding such as Huffman and arithmetic coding.

When no more slices remain, in 213 the compression stops, and the compression tool 110 can output a compressed bit-stream of the input 3D points.

Figure 9:
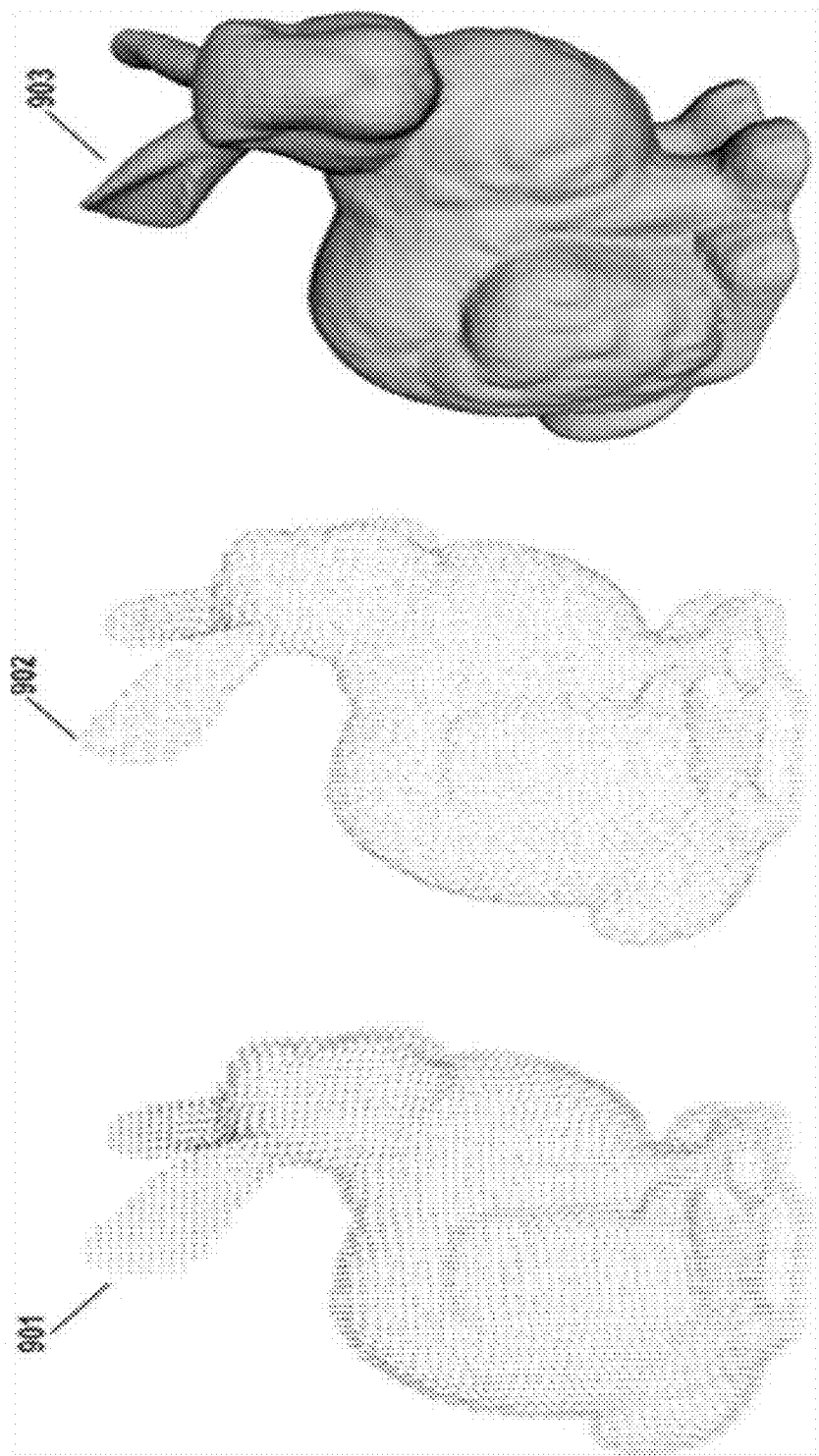
FIG. 9 shows the smoothing step after decompression, and the application of mesh reconstruction, according to various implementations.

As discussed above, the compression tool 110 (or other compression/decompression tool or device) can decompress the compressed bit-stream. The decompression is performed in inverse order, where the entropy decoding is applied at first. Then the chain code decoding follows in top-down order and the segments' contours are reconstructed within 3D voxel space. After decoding, the reconstruction follows, where the point at each voxel's center is used. Further, the original 3D coordinates of the first segment are used, in order to offset the reconstructed point cloud into its original position. For example, as illustrated in FIG. 9, this roughly approximates the original point cloud data based on the resolution of the grid 901. In order to obtain a smoother point cloud surface, the points are moved slightly based on their average surrounding. This is achieved by calculating the k-nearest neighbors of each point, and averaging their positions as the new given point's position. k is a user-defined parameter, depending on how smooth the point cloud should be. Optionally, once the point cloud is smoothed 902, the reconstruction algorithm can be used 903, such as the approximate surface reconstruction algorithm by Repnik and Zalik (e.g. see "Amenta et al., A new Voronoi-based surface reconstruction algorithm, In Proceedings of the 25th annual conference on Computer graphics and interactive techniques, pp. 415-421, 1998", "Amenta et al., The power crust, In Proceedings of the sixth ACM symposium on Solid modeling and applications, pp. 249-266, 2001", "Repnik and Zalik, A fast algorithm for approximate surface reconstruction from sampled points, Advances in Engineering Software, 53 (1), pp. 72-78, 2012"). The proposed method is near-lossless, since the original points' positions are lost, while the smoothed ones closely resemble them.

Figure 10:
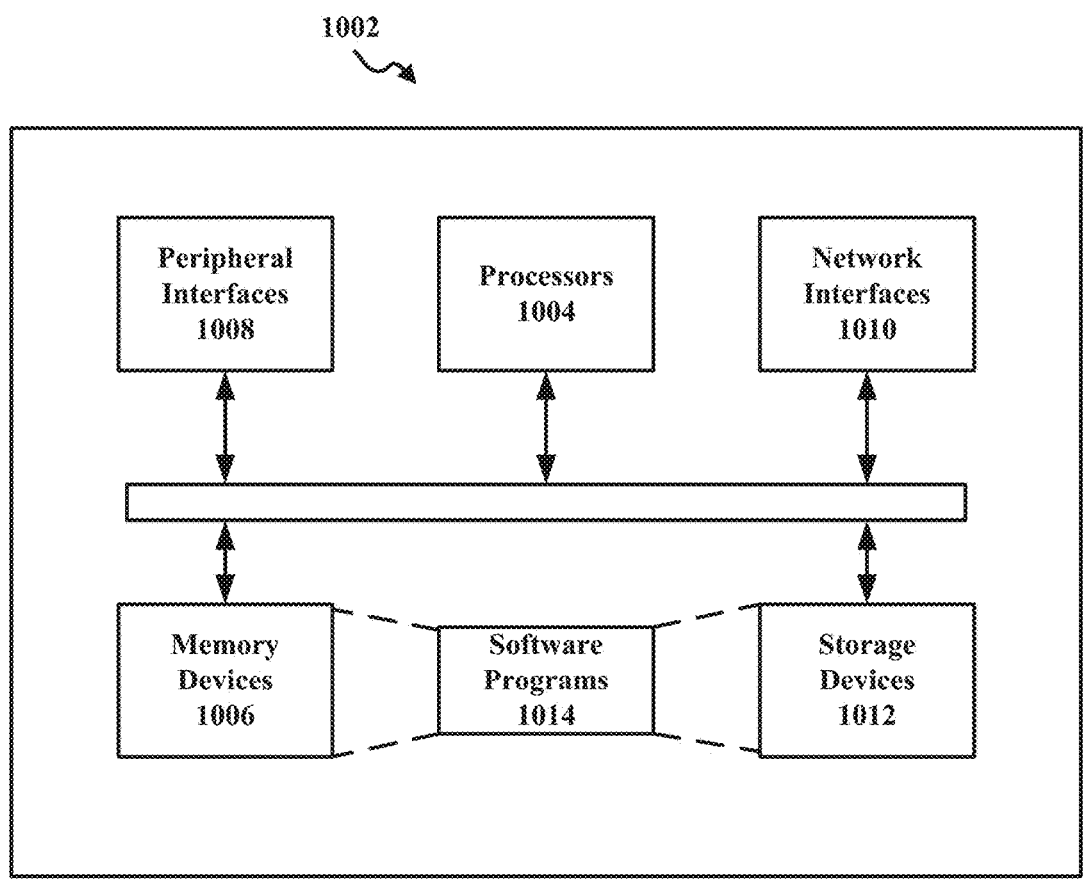
FIG. 10 is an example of components of a computing system, according to various implementations.

FIG. 10 is a diagram depicting an example of a hardware configuration for a device 1002, such as the computing system 105, that can be used to perform one or more of the processes described above. While FIG. 10 illustrates various components contained in the device 1002, FIG. 10 is one example of a device and that additional components can be added and existing components can be removed.

As illustrated in FIG. 10, the device 1002 can include one or more processors 1004 of varying core configurations and clock frequencies. The device 1002 can also include one or more memory devices 1006 that serve as a main memory during the operation of the device 1002. The device 1002 can also include one or more peripheral interfaces 1008, such as keyboards, mice, touchpads, computer screens, touchscreens, etc., for enabling human interaction with and manipulation of the device 1002.

The device 1002 can also include one or more network interfaces 1010 for communicating via one or more networks, such as Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (Wi-MAX), Long Term Evolution (LTE), etc. The device 1002 can also include one or more storage device 1012 of varying physical dimensions and storage capacities, such as flash drives, hard drives, random access memory, etc., for storing data, such as images, files, and program instructions for execution by the one or more processors 1004.

Additionally, the device 1002 can include one or more software programs 1014, such as an operating system and the compression tool 110 (when implemented as software). The one or more software programs 1014 can include instructions that cause the one or more processors 1004 to perform the processes described. The one or more software programs can be stored in the one or more memory devices 1006 and/or on in the one or more storage devices 1012.

In implementations, the components of the device 1002 need not be enclosed within a single enclosure or even located in close proximity to one another. Those skilled in the art will appreciate that the above-described componentry are examples only, as the device 1002 can include any type of hardware componentry, including any necessary accompanying firmware or software, for performing the disclosed implementations. The device 1002 can also be implemented in part or in whole by electronic circuit components or processors, such as application-specific integrated circuits (ASICs) or field-programmable gate arrays (FPGAs).

Certain implementations described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Examples of computer readable storage devices and media include conventional computer system RAM (random access memory), ROM (read-only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more."

Also, the term "couple" or "couples" is intended to mean either an indirect or direct connection. Thus, if a first device couples to a second device, that connection may be through a direct connection, or through an indirect connection via other devices, components, and connections. Those skilled in the art will recognize that these and other variations are possible within the spirit and scope as defined in the following claims and their equivalents.

What is claimed is:

1. A computer-implemented method of data compression, the method comprising:
    identifying a dataset representing one or more images, wherein the dataset comprises at least one of point cloud data or points from a 3D mesh;
    determining a set of voxels for the dataset;
    determining a set of 2D slices from the set of voxels of the dataset, wherein determining the set of 2D slices comprises slicing the set of voxels in one direction to form cross-sections of the one or more images, and wherein the one direction is parallel to a coordinate axis corresponding to a shortest side of a bounding box for the set of voxels to form the set of 2D slices that are orthogonal to the shortest side of the bounding box;
    determining a set of segments for each slice in the set of 2D slices; wherein a segment comprises one or more connected pixels in a 2D slice;
    compressing, by one or more processors, each segment in the set of segments to form a compressed set of 2D slices; and
    applying entropy coding to the compressed set of 2D slices.

2. The computer-implemented method of claim 1, wherein determining a set of voxels comprises:
    creating a voxel grid over the dataset; and
    wherein determining a set of 2D slices from the set of voxels of the dataset comprises:
    estimating one or more points that are associated with a voxel in the voxel grid; and
    slicing the voxel grid into 2D binary rasters.

3. The computer-implemented method of claim 1, wherein compressing each segment in the set of segments comprises:
    applying chain code encoding over each contour of each segment to form a chain code;
    efficiently storing, for each segment, a starting position of the chain code encoding; and
    compressing the chain code.

4. The computer-implemented method of claim 3, wherein efficiently storing, for each segment, a starting position comprises:
    coding the starting position based on distances to other positions on a raster grid; and
    using variable length encoding to store an offset of the position based on the distances.

5. The computer-implemented method of claim 1, wherein determining a set of segments for each slice in the set of 2D slices comprises:
    locating the set of segments based on a flood fill algorithm.

6. The computer-implemented method of claim 1, the method further comprising:
    decompressing the compressed set of 2D slices to form a decompressed set of 2D slices; and
    performing point cloud reconstruction of the decompressed set of 2D slices.

7. The computer-implemented method of claim 6, the method further comprising:
    performing surface reconstruction of the decompressed set of 2D slices.

8. The computer-implemented method of claim 6, wherein performing point cloud reconstruction comprises:
    constructing points from each non-empty voxel's center to form an approximate point cloud; and
    applying smoothing over the approximate point cloud.

9. The computer-implemented method of claim 1, wherein decompression comprises at least one of:
    entropy decoding;
    chain code decoding; and
    voxel space reconstruction.

10. An apparatus, comprising:
    one or more memory devices storing instructions; and
    one or more processors coupled to the one or more memory devices, wherein the one or more processors execute the instructions to perform a method comprising:
    identifying a dataset representing one or more images, wherein the dataset comprises at least one of point cloud data or points from a 3D mesh;
    determining a set of voxels for the dataset;
    determining a set of 2D slices from the set of voxels of the dataset, wherein determining the set of 2D slices comprises slicing the set of voxels in one direction to form cross-sections of the one or more images, and wherein the one direction is parallel to a coordinate axis corresponding to a shortest side of a bounding box for the set of voxels to form the set of 2D slices that are orthogonal to the shortest side of the bounding box;
    determining a set of segments for each slice in the set of 2D slices; wherein a segment comprises one or more connected pixels in a 2D slice;
    compressing each segment in the set of segments to form a compressed set of 2D slices; and
    applying entropy coding to the compressed set of 2D slices.

11. The apparatus of claim 10, wherein determining a set of voxels comprises:
    creating a voxel grid over the dataset; and
    wherein determining a set of 2D slices from the set of voxels of the dataset comprises:
    estimating one or more points that are associated with a voxel in the voxel grid; and
    slicing the voxel grid into 2D binary rasters.

12. The apparatus of claim 10, wherein compressing each segment in the set of segments comprises:
    applying chain code encoding over each contour of each segment to form a chain code;
    efficiently storing, for each segment, a starting position of the chain code encoding; and
    compressing the chain code.

13. The apparatus of claim 12, wherein efficiently storing, for each segment, a starting position comprises:
    coding the starting position based on distances to other positions on a raster grid; and
    using variable length encoding to store an offset of the position based on the distances.

14. The apparatus of claim 10, wherein determining a set of segments for each slice in the set of 2D slices comprises:

locating the set of segments based on a flood fill algorithm.

15. The apparatus of claim 10, wherein the one or more processors execute the instructions to perform the method further comprising:
  decompressing the compressed set of 2D slices to form a decompressed set of 2D slices; and
  performing point cloud reconstruction of the decompressed set of 2D slices.

16. A computer readable storage medium comprising instructions for causing one or more processors to perform a method comprising:
  identifying a dataset representing one or more images, wherein the dataset comprises at least one of point cloud data or points from a 3D mesh;
  determining a set of voxels for the dataset;
  determining a set of 2D slices from the set of voxels of the dataset, wherein determining the set of 2D slices comprises slicing the set of voxels in one direction to form cross-sections of the one or more images, and wherein the one direction is parallel to a coordinate axis corresponding to a shortest side of a bounding box for the set of voxels to form the set of 2D slices that are orthogonal to the shortest side of the bounding box;
  determining a set of segments for each slice in the set of 2D slices; wherein a segment comprises one or more connected pixels in a 2D slice;
  compressing, by one or more processors, each segment in the set of segments to form a compressed set of 2D slices; and
  applying entropy coding to the compressed set of 2D slices.

17. The computer readable storage medium of claim 16, wherein determining a set of voxels comprises:
  creating a voxel grid over the dataset; and
  wherein determining a set of 2D slices from the set of voxels of the dataset comprises:
  estimating one or more points that are associated with a voxel in the voxel grid; and
  slicing the voxel grid into 2D binary rasters.

18. The computer readable storage medium of claim 16, wherein compressing each segment in the set of segments comprises:
  applying chain code encoding over each contour of each segment to form a chain code;
  efficiently storing, for each segment, a starting position of the chain code encoding; and
  compressing the chain code.

19. The computer readable storage medium of claim 18, wherein efficiently storing, for each segment, a starting position comprises:
  coding the starting position based on distances to other positions on a raster grid; and
  using variable length encoding to store an offset of the position based on the distances.

20. The computer readable storage medium of claim 16, wherein determining a set of segments for each slice in the set of 2D slices comprises:
  locating the set of segments based on a flood fill algorithm.

21. The computer readable storage medium of claim 16, the method further comprising:
  decompressing the compressed set of 2D slices to form a decompressed set of 2D slices; and
  performing point cloud reconstruction of the decompressed set of 2D slices.

* * * * *